United States Patent
Kumar et al.

[19]

[11] Patent Number: 5,933,850
[45] Date of Patent: Aug. 3, 1999

[54] INSTRUCTION UNIT HAVING A PARTITIONED CACHE

[75] Inventors: Rajendra Kumar, Sunnyvale; Rajiv Gupta, Los Altos; William S. Worley, Jr., Saratoga, all of Calif.

[73] Assignee: Hewlett-Packard Company, Palo Alto, Calif.

[21] Appl. No.: 08/843,795

[22] Filed: Apr. 21, 1997

Related U.S. Application Data

[63] Continuation of application No. 08/299,174, Aug. 31, 1994, abandoned.

[51] Int. Cl.$^6$ .............................. G06F 12/00; G06F 13/00
[52] U.S. Cl. ......................... 711/125; 711/126; 711/129; 711/140; 711/148; 711/169
[58] Field of Search ................................... 711/125, 126, 711/129, 140, 148, 169

[56] References Cited

U.S. PATENT DOCUMENTS

| | | | |
|---|---|---|---|
| 4,506,322 | 3/1985 | Leigh | 395/496 |
| 4,646,233 | 2/1987 | Weatherford et al. | 364/200 |
| 4,691,277 | 9/1987 | Kronstadt et al. | 395/421.03 |
| 4,783,736 | 11/1988 | Ziegler et al. | 395/457 |
| 4,847,753 | 7/1989 | Matsuro et al. | 395/375 |
| 5,027,270 | 6/1991 | Riordan et al. | 395/467 |
| 5,163,140 | 11/1992 | Stiles et al. | 395/467 |
| 5,210,849 | 5/1993 | Takahashi et al. | 395/471 |
| 5,214,765 | 5/1993 | Jensen | 395/449 |
| 5,283,873 | 2/1994 | Steely, Jr. et al. | 395/375 |
| 5,293,592 | 3/1994 | Fu et al. | 395/375 |
| 5,375,215 | 12/1994 | Hanawa et al. | 395/496 |
| 5,404,466 | 4/1995 | Inoue | 395/375 |
| 5,404,486 | 4/1995 | Frank et al. | 395/455 |
| 5,442,757 | 8/1995 | McFarland et al. | 395/375 |
| 5,479,641 | 12/1995 | Nadir et al. | 395/455 |
| 5,488,710 | 1/1996 | Sato et al. | 395/452 |
| 5,506,976 | 4/1996 | Jaggar | 395/375 |

FOREIGN PATENT DOCUMENTS

| | | | |
|---|---|---|---|
| 0019358A1 | 11/1980 | European Pat. Off. | G11C 9/06 |
| 0 413 434 A2 | 2/1991 | European Pat. Off. | G06F 9/38 |
| 0 651 322 A1 | 5/1995 | European Pat. Off. | G06F 9/38 |
| 1488980 | 4/1975 | United Kingdom | G11C 9/00 |
| 2210479 | 6/1989 | United Kingdom | G06F 12/10 |

OTHER PUBLICATIONS

Hwu et al., "Comparing Software and Hardware Schemes for Reducing the Cost of Branches", 16th. Annual International Symposium on Computer Architecture, pp. 224–231, 1989.

David R. Ditzel & Hubert R. McLellan, "Branch Folding in the CRISP Microprocessor Reducing Branch Delay to Zero", AT&T, pp. 2–9, (ACM 0084–7495).

B. Ramakrishna Rau "Levels of Representation of Programs and the Architecture of Universal Host Machines", University of Illinois, Report R–819, Aug. 1978, pp. 1–44.

*Primary Examiner*—Tod R. Swann
*Assistant Examiner*—Tuan V. Thai

[57] ABSTRACT

An instruction cache which separates storage cells for instruction data from storage cells for sequence control is disclosed. Instructions are decoded prior to being stored to the instruction cache which serves a primary cache, while prior hierarchical levels of memory store instructions in an encoded form. Because the instructions have a variable-length, the instruction cache includes a next address determination circuit to determine the next instruction address. The invention is advantageous because the separation of storage cells enables a next instruction address to be generated during a fetch stage for a current instruction, thereby avoiding the need for an otherwise necessary additional decoding stage. A bypass mechanism useful for any cache following a cache miss is also disclosed.

18 Claims, 7 Drawing Sheets

INSTRUCTION UNIT HAVING A PARTITIONED CACHE

CROSS REFERENCE TO RELATED APPLICATION

This is a continuation of application Ser. No. 08/299,174 filed on Aug. 31, 1994, now abandoned.

BACKGROUND OF THE INVENTION

1. Field of the Invention

The present invention relates to an instruction cache and, more particularly, to a decoded instruction cache for an instruction unit.

2. Description of the Related Art

High performance computers typically use an instruction layout which is encoded. For example, in Very-Large-Instruction-Word (VLIW) computers, multiple instructions are encoded within an instruction-word. When an instruction-word is decoded, several instructions which are to be simultaneously executed in a pipeline are obtained. Given that the instruction layout of high performance computers is long, memory storage for the instructions is conserved if the instructions are not decoded until the instructions are issued. However, this approach requires an extra clock cycle or pipeline stage to decode the instructions after they are issued from the instruction cache. Another approach is to decode the instructions for only the later stages in the memory hierarchy. Namely, instructions stored in a secondary cache would be in encoded form, but would be decoded before stored in a primary cache.

The problem is more severe in computers which use a variable length instruction, yet concurrently issue multiple operations. In this case, even if an extra clock cycle or pipeline stage for decoding is avoided, determination of the address of the instruction to be issued next requires an extra cycle or stage in the pipeline. The next instruction could be a target address of a branch instruction or a sequential address. The sequential address can itself vary depending on how many operations are issued by the previous instruction.

Thus, there is a need for a mechanism to determine the address for a next instruction without having to use an extra clock cycle or an additional stage in a pipeline.

SUMMARY OF THE INVENTION

Broadly speaking, the invention relates to an instruction cache which separates storage cells for instruction data from storage cells for sequence control so as to enable a next instruction address to be generated in a fetch stage of a current instruction. The invention avoids the need for an additional stage in the pipeline to determine the next instruction address.

As an instruction unit for a computer using pipeline processing to execute variable-length instructions, the invention includes an instruction cache and a next-address determination circuit. The instruction cache has numerous entries, each entry having a first portion for storing an instruction, a second portion for storing an address tag corresponding to the instruction, and a third portion for storing sequence control data associated with the instruction. The next-address determination circuit determines an address for a next instruction based on the sequence control data corresponding to a current instruction. The instruction unit operates such that, during a fetch stage of the pipeline processing, when an address for a current instruction matches one of the stored address tags, the current instruction is read from the first portion of the instruction cache while at the same time the sequence control information corresponding the current instruction is read from the third portion of the cache and the next-address determination circuit determines the address for the next instruction.

Alternatively, as an instruction unit for storing instructions for functional units of a computer, the invention includes a prefetch buffer for temporarily storing an encoded instruction, an instruction decoder for decoding the encoded instruction stored in the prefetch buffer to produce at least one decoded instruction and related flow control data, a tag buffer for temporarily storing an instruction address corresponding to the encoded instruction, and an instruction cache. The instruction cache supports numerous extras and includes a first portion for storing the decoded instruction, a second portion for storing an address tag and subsequently comparing the stored address tag with a current instruction address, and a third portion for storing the related flow control data.

The invention also relates to a bypass mechanism which is useful for any cache following a cache miss. The bypass mechanism is particularly advantageous when bit lines of the cache are also used as a portion of the bypass mechanism because wiring requirements to implement the bypass are eliminated and data access following a cache miss is reduced by a cycle.

Other aspects and advantages of the invention will become apparent from the following detailed description, taken in conjunction with the accompanying drawings, illustrating by way of example the principals of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–7. However, those skilled in the art will readily appreciate that the detailed description given herein with respect to these figures is for explanatory purposes as the invention extends beyond these limited embodiments.

Figure 1:
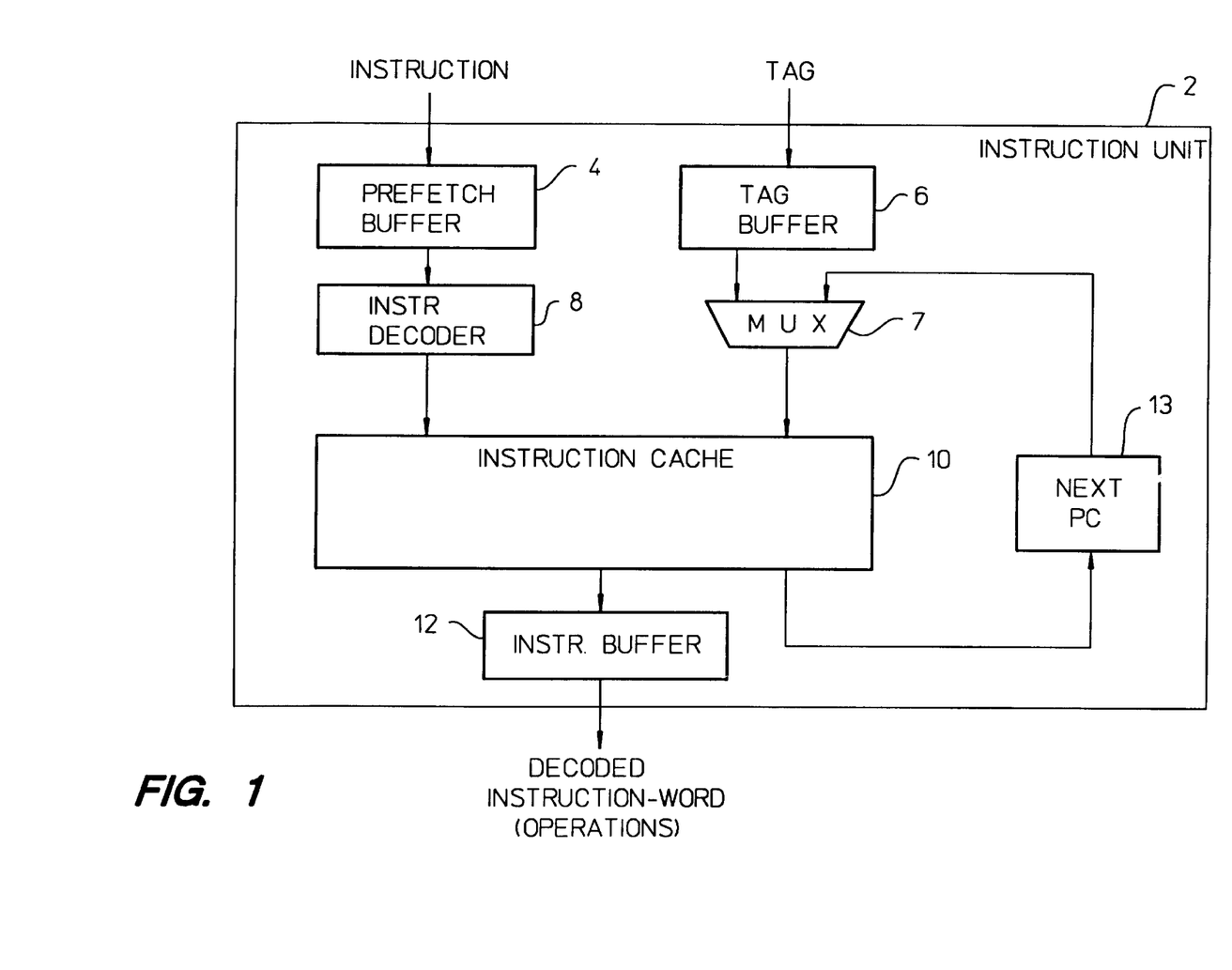
FIG. 1 is a block diagram of an instruction unit according to the invention.

FIG. 1 is a block diagram of an instruction unit 2 according to the invention. The overall operation of the instruction unit 2 is to receive an instruction together with its associated tag and to supply instructions (operations) to one or more functional units of a processing system. The functional units then carry-out the instructions.

The instruction unit 2 includes a prefetched buffer 4 which receives an instruction from an instruction stream and stores the instruction in the prefetch buffer 4. The instructions received are encoded because they actually are instruction-words which represent (in a coded manner) a variable number of instructions. For example, each encoded instruction could be decoded into anywhere from one to four instructions. The instruction unit 2 also includes a tag buffer 6 which stores a tag corresponding to the instruction stored in the prefetched buffer 4. The instruction and tag received by the instruction unit 2 may, for example, come from a lower level cache memory or main memory. In any case, the tag buffer 6 supplies a stored tag to a multiplexer 7, and the prefetch buffer 4 supplies the instruction or instructions stored in the prefetch buffer 4 to an instruction decoder 8. The instruction decoder 8 functions to decode the instructions before they are loaded into a primary instruction cache 10. The decoded instructions are then supplied from the instruction cache 10 to an instruction buffer 12 and then on to various functional units of the processing system.

The output of the multiplexer 7 also supplies an address to the instruction cache 10. The address being supplied to the instruction cache 10 is either a tag stored in the tag buffer 6 or a next address determined by a next-address determining circuit 13. The next-address determining circuit 13 receives sequence control information from the instruction cache 10 and uses this information in conjunction with a current address to determine the next address. For example, the sequence control information might indicate that the current instruction is a branch operation which is predicted to take or not take, a word-instruction in which two instructions are issued simultaneously, or a word-instruction in which three instructions are issued simultaneously.

Although the invention employs encoded instructions to increase code density, the instructions are decoded before they are written into the primary instruction cache 10. Because the instructions are decoded prior to storage in the instruction cache 10, an extra clock cycle or pipeline stage is not needed to decode the instructions prior to their execution. This is advantageous because the additional clock cycle or pipeline stage would increase the misprediction penalty for branch instructions. By storing the instructions in a compressed or encoded format while on disk, in main memory or in lower level cache memory, memory storage is reduced in the lower memory levels (e.g., level 2 cache, main memory), yet the primary instruction cache 10 is kept relatively small. This approach also reduces the length of the execution pipeline because instruction decoding is not needed when the instructions are issued.

Further, as will become more evident below, the invention enables a next instruction address to be generated in a fetch stage of a current instruction. This feature is highly advantageous because it eliminates the need for an additional stage in the pipeline of the computer system executing the instructions which would otherwise be required to determine the next instruction address.

Figure 2:
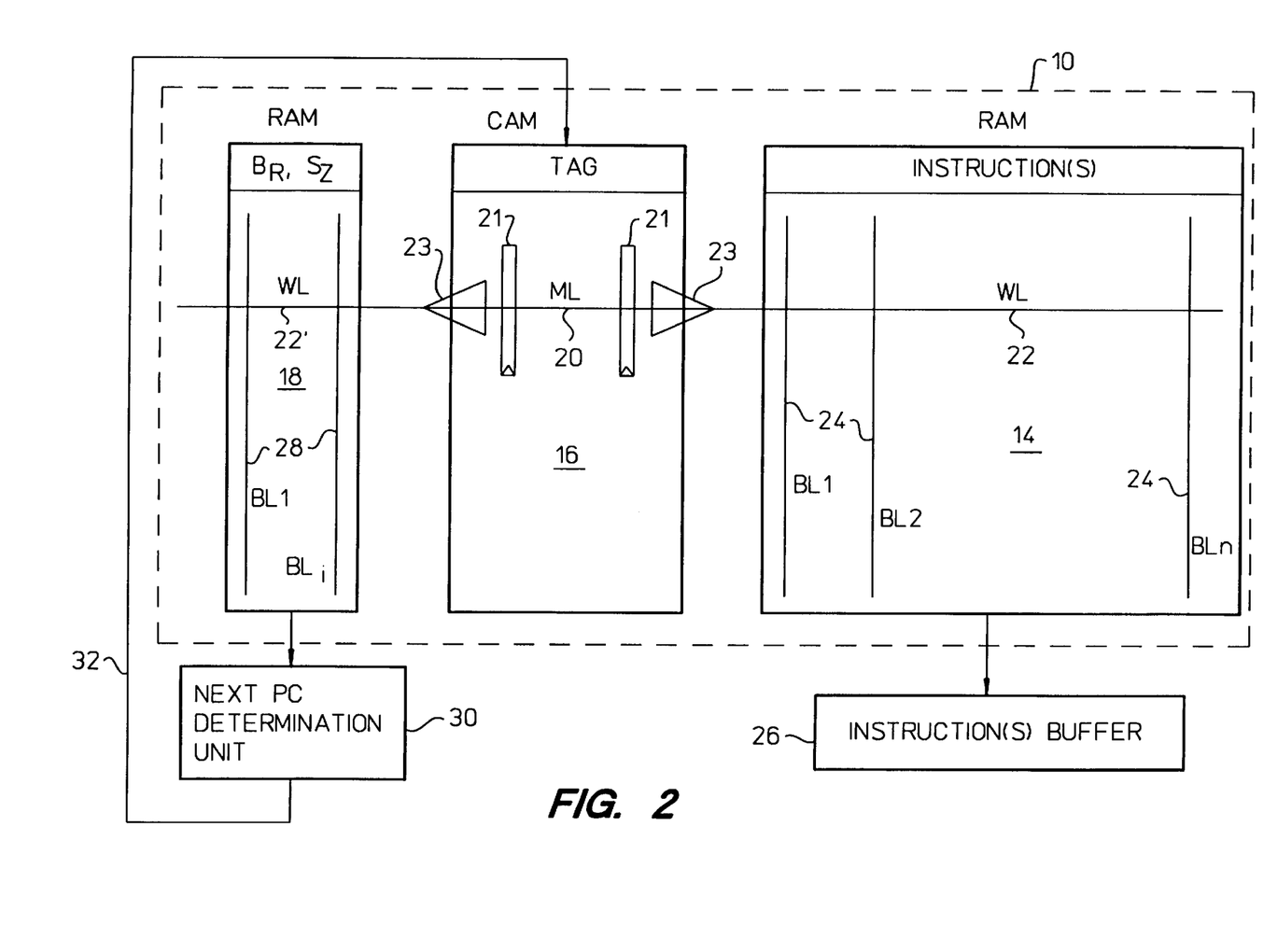
FIG. 2 is a block diagram of an embodiment of the instruction cache according to the invention.

FIG. 2 is a block diagram of an embodiment of the instruction cache 10. The instruction cache 10 is fully-associative and includes a first storage region 14, a second storage region 16, and a third storage region 18. These three storage regions are separate storage regions on a single chip which can be formed by vertically partitioning a semiconductor memory.

The second storage region 16 is more precisely a storage and compare region. Alternatively, the second storage region 16 may be coupled to a compare circuit (not shown). The first storage region 14 stores the instructions themselves in their decoded form. The second storage region 16 stores an address tag which is associated with the corresponding decoded instruction stored in the first storage region 14. The third storage region 18 stores sequence control data which is related to the associated address tag and instruction. That is, each entry in the first storage region 14 has a corresponding entry in the second storage region 16 and the third storage region 18. Preferably, the first and third storage regions 14 and 18 are random access memories (RAM), and the second storage region 16 (including the compare circuit) is a content-addressable memory (CAM). Furthermore, it may be preferable to horizontally partition the instruction cache 10 as described in copending U.S. patent application Ser. No. 08/298,861 entitled "Horizontally Partitioned Instruction Cache", and filed concurrently herewith, which is hereby incorporated by reference. For example, the instruction cache 10 could be horizontally partitioned into a sequential cache, branch target cache and a victim cache.

The operation of the instruction cache illustrated in FIG. 2 is as follows. The second storage region 16 receives the address for the next instruction. This address is compared with the stored address tags for each of the entries within the second storage region 16. If a match is found, the associated match line (ML) 20 for the particular entry is driven high and latched into latches 21. The latches 21 then in turn separately drive word lines (WL) 22 and 22' via buffers 23. Although the word lines 22 and 22' are both driven by the same match line 20, they are isolated from one another. Accordingly, the capacitive and resistive load appearing on word line 22 will differ from the capacitive and resistive load appearing on word line 22'. As designed, the capacitive and resistive load appearing on word line 22' is significantly smaller than that appearing on the word line 22 because the third storage area 18 stores only a few bits, whereas the first storage region 14 stores an entire instruction which is typically at least 32 bits. As an example, each entry in the third storage region 18 may store 8 bits, while each entry in the first storage region 14 may store 256 bits.

In any case, once the word lines 22 and 22' are driven high, certain of the bit lines are in turn driven high depending upon the stored bits at the particular entry being read. Specifically, the first storage region 14 includes bit lines 24 (BL1, BL2, . . . , BLn), and the third storage region 18 includes bit lines 28 (BL1, . . . , BLi, where i is less than n). The data read from the first storage region 14 via the bit lines 24 is a decoded instruction which is stored in an instruction buffer 26. The decoded instruction is thereafter supplied from the instruction buffer 26 to the execution pipeline where the instruction is executed.

In the next clock cycle, the instruction unit 2 must provide the next instruction to be executed by the execution pipeline to the instruction buffer 26. When decoding is given its own stage in the execution pipeline, the next instruction can be easily determined but will be a cycle late. However, when the pipeline does not make use of a decoding stage, the determination of the next instruction to be executed can be difficult. For example, the normally sequential issuance of instructions can vary in sequence for numerous reasons, namely branches and variable length instructions. In order to provide the next instruction address in time for the next clock cycle, the next instruction address must be supplied to the second storage region 16 just prior to the beginning of this subsequent cycle.

Conventionally, the sequence control data would be stored in the first storage region 14 along with the instruction data. However, doing so prevents the next address from being determined by the beginning of the next cycle. As a result, conventionally an entire additional cycle would be required to compute the next address. The improvement provided by the present invention is that the sequence control data is now separated from the instruction data and contained in a separate storage region such that the sequence control data can be read more rapidly than can the instruction data. Consequently, a next program counter (PC) determination unit 30 which computes the next instruction address and supplies it to the second storage region 16 via data lines 32 all within the current cycle. Hence, the invention operates to determine a next instruction address in the fetch stage of the pipeline processing of a current instruction.

Figure 3:
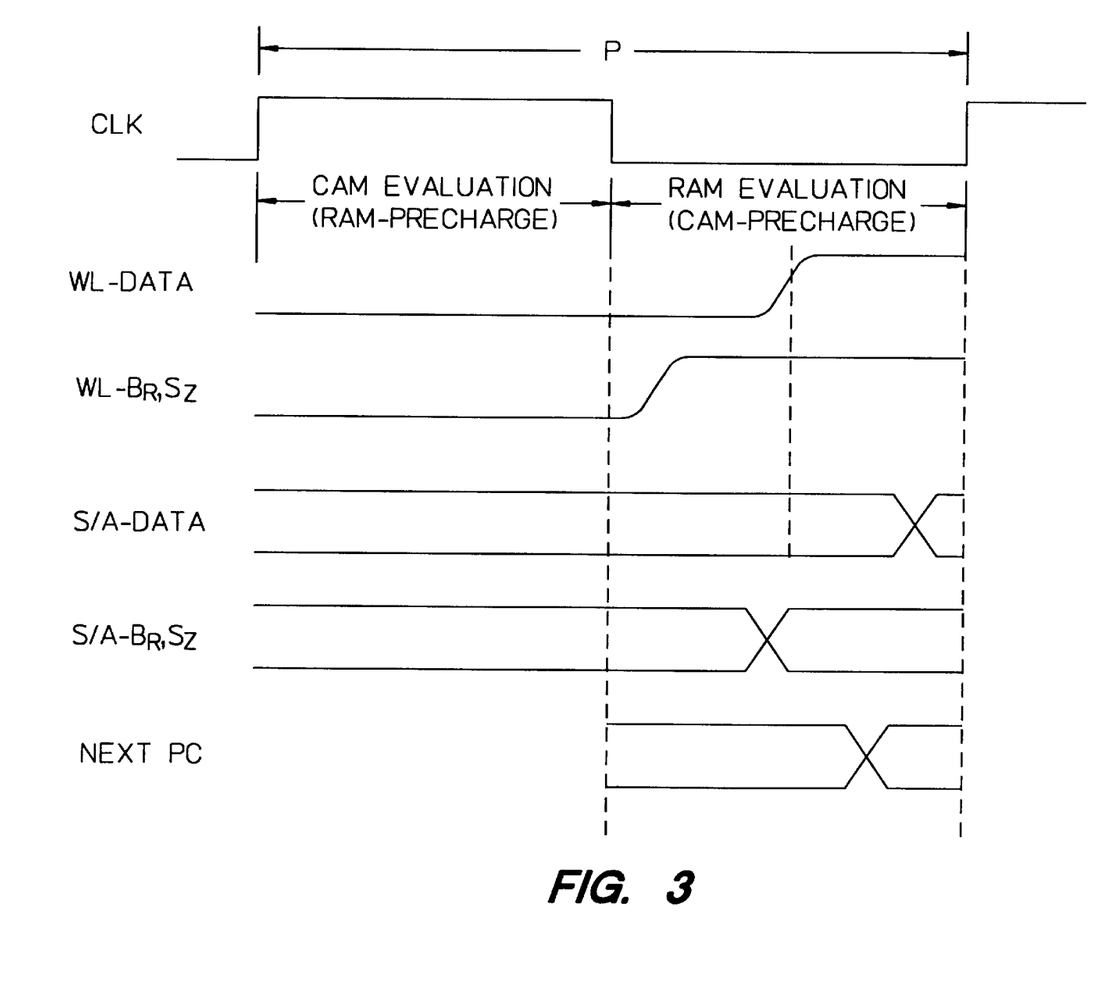
FIG. 3 is a timing diagram for the present invention.

FIG. 3 is a timing diagram of the operations of the instruction cache 10 shown in the FIG. 2. The processing system executes operations or instructions in accordance with a timing clock (CLK). As shown, the timing clock has a period P. As an example, the period P is currently about four nanoseconds in high performance computers such as workstations. During a first half of the timing clock's cycle, the address evaluation occurs in the second storage region 16 (CAM), and the RAM storage in the first and third storage regions 14 and 18 is precharged. During the second half of the timing clock's cycle, the RAM of the first and third storage regions 14 and 18 is read and the second storage region 16 is precharged.

The second half of the timing clock's cycle is now described in detail to illustrate the operation and advantages of the invention. The word line (WL-Data) for the first storage region 14 is shown as becoming active or high during the second half of the timing clock's cycle. In contrast, the word line (WL-Br, Sz) for the third storage region 18 is shown as becoming high or active in the second half of the timing clock's cycle but prior (about one nanosecond sooner in the exemplary case) to the transitioning of the word line (WL-Data) for the first storage region 14. The bit lines 24 and 28 of the first and third storage regions 14, 18, although not illustrated in the FIG. 3, stabilize about 0.5 nanoseconds after the corresponding word line has become high or active. Thereafter, sense amplifiers (S/A) for the first and third storage regions 14, 18 sense the data values from bit lines 24 and sense the sequence control data from bit lines 28. However, as shown in FIG. 3, the sequence control data read from the third storage region 18 is stabilized and ready to be read about prior to (about one nanosecond prior to) that of the first storage region 14. Within this one nanosecond window, the fast hardware circuitry within the next PC determination unit 30 is able to compute the next address such that on the rising edge of the next half clock cycle not only is the instruction data read from bit lines 24 stored to the instruction buffer 26, but also the next address is stored to a next address buffer. Consequently, at the beginning of the next clock cycle, the address for the next instruction is available and supplied to the instruction cache 2 for address evaluation.

Figure 4:
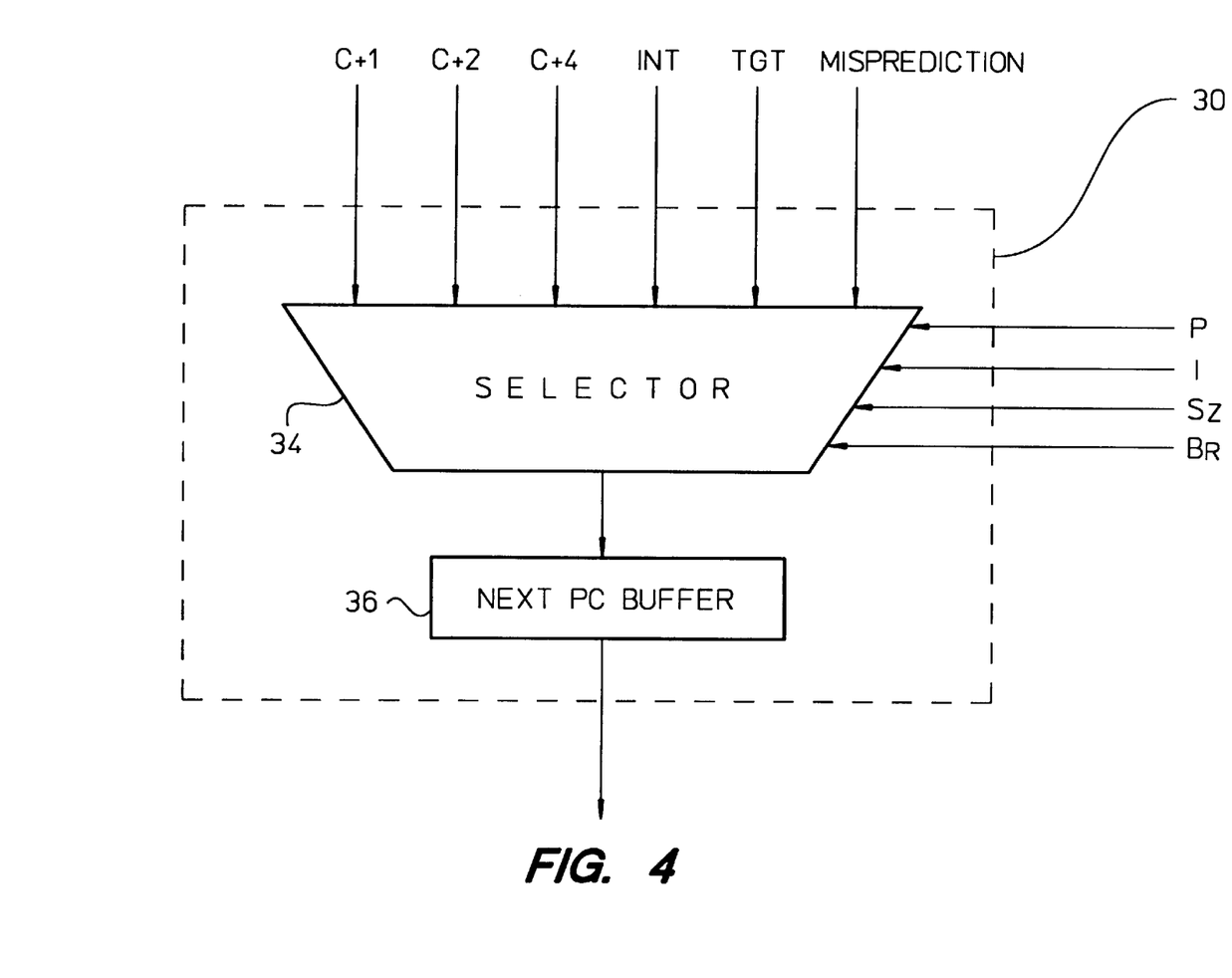
FIG. 4 is a block diagram of an embodiment of a next PC determination unit according to the invention.

FIG. 4 is a block diagram of a first embodiment of the next PC determination unit 30. The next PC determining unit 30 in this embodiment includes a selector 34 and a next PC buffer 36. The selector 34 receives various predetermined addresses on its data inputs. These addresses include sequential addresses (C+1, C+2, and C+4), an interrupt address (INT), a target address (TGT), and a misprediction address. Sequential addresses C+1, C+2 and C+4 respectively correspond to the current address (C) incremented by one, the current address (C) incremented by two, and the current address (C) incremented by four.

Multiple sequential addresses are shown in this embodiment because high performance computer systems generally can issue single instructions or multiple instructions in a given clock cycle. Here, it is assumed that the computer system can issue either a single instruction, or two or four instructions concurrently. The interrupt address (INT) is supplied so that in the event of an interrupt, control would proceed to the interrupt address. The target address (TGT) is associated with a branch operation, and the misprediction address is associated with a prior branch instruction which was assumed to have been taken or not taken when in fact the opposite was needed.

The selector 34 selects one of these addresses based on numerous control lines. The control lines shown in this embodiment are a prediction bit (P), an interrupt bit (I), one or more size bits (Sz), and one or more branch bits (Br). If the branch bit (Br) is not set the selector 34 will select one of the sequential addresses based on the one or more size bits (Sz). If the interrupt bit is set, the selector 34 will select the interrupt address (INT). If the branch bit (Br) is set the selector 34 will select the target address (TGT) if the prediction bit (P) is also set; otherwise, it chooses one of the sequential addresses. The prediction bit (P) can be determined statically by a compiler or dynamically by branch prediction circuitry. If static prediction is used, the prediction bit (P) may be included within the sequence control data. The misprediction address is selected by the selector 34 when an instruction still in the pipeline was selected as the predicted branching address and later determined to be erroneous. In any case, whichever of the selection by the selector 34, the selected address for the next instruction address is stored in the next PC buffer 36.

Figure 5:
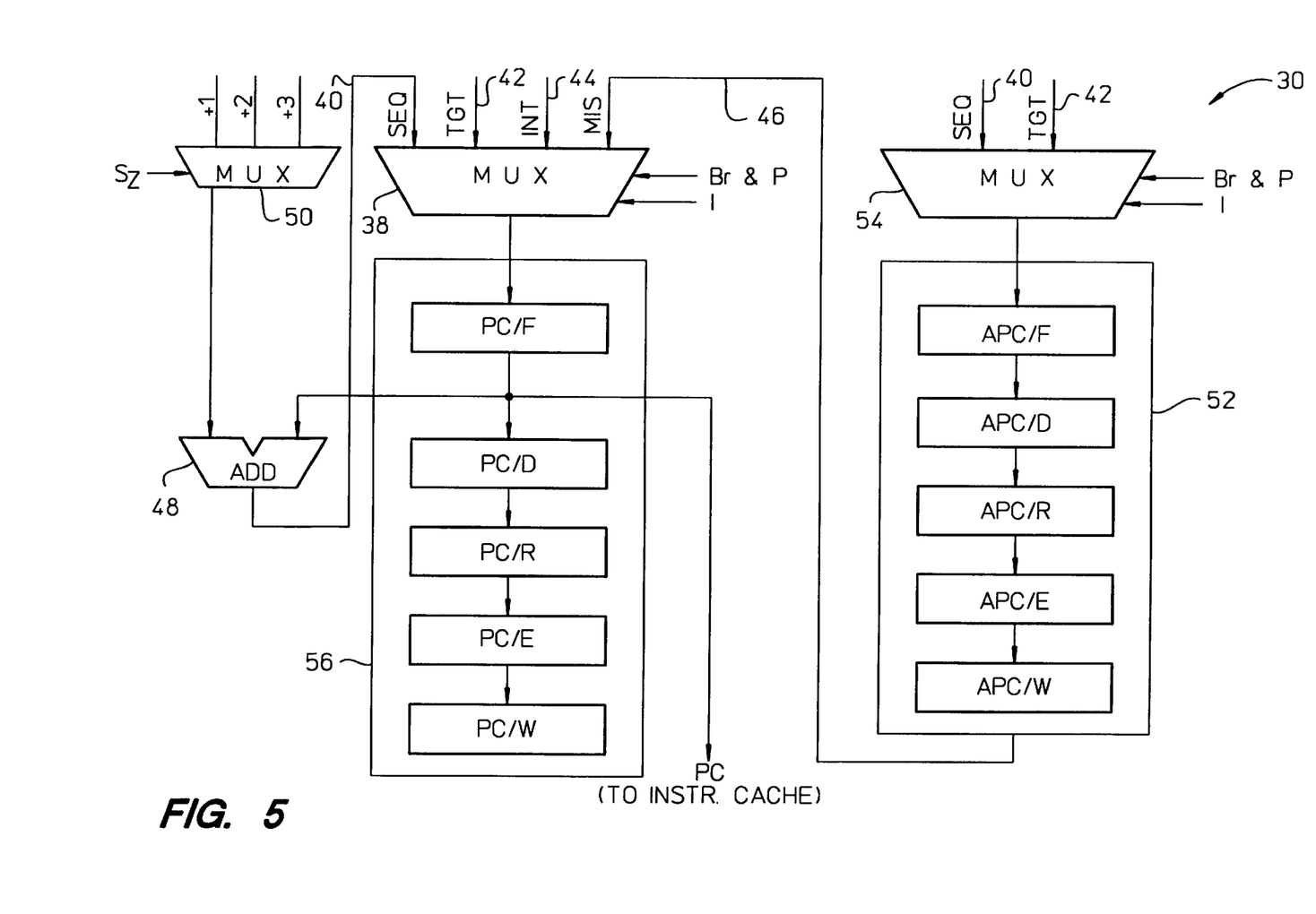
FIG. 5 is another embodiment of the next PC determination unit according to the invention.

FIG. 5 is a second embodiment of the next PC determination unit 30. In this embodiment, a multiplexer 38 receives a sequential address 40 (SEQ), a target address 42 (TGT), an interrupt address 44 (INT), and a misprediction address 46 (MIS). The multiplexer 38 selects one of these input addresses based upon the control signals. The control signals are an interrupt signal (I) and a branch with prediction signal (Br & P). In the exemplary case, the branch with prediction signal includes a branch bit and a prediction bit. The branch bit (Br) indicates whether the current instruction is a branch instruction. The prediction bit (P) indicates whether or not it is predicted that the branch will be taken.

The sequential address 40 is supplied to the multiplexer 38 via an addition circuit 48 which adds a current address with an increment amount supplied by a multiplexer 50. The multiplexer 50 selects the incremented amount based on the size (Sz) of the current instruction (as decoded). The incremented amount, for example, may be one, two or four.

The misprediction address 46 is supplied by an alternate address pipeline 52 which stores a program counter (PC) for each of the pipeline stages (e.g., FDREW) in a first-in-first-out manner. Addresses are input into the alternate instruction address pipeline 52 via a multiplexer 54 which selects one of the sequential address 40 and the target address 42 based on the same control signals (I, Br & P) as used by the multiplexer 38. The output of the multiplexer 38 is the address for the next instruction, known as the next PC. This address is also supplied to an instruction address pipeline 56 which stores the current address for each of the stages of the execution pipeline.

Figure 6:
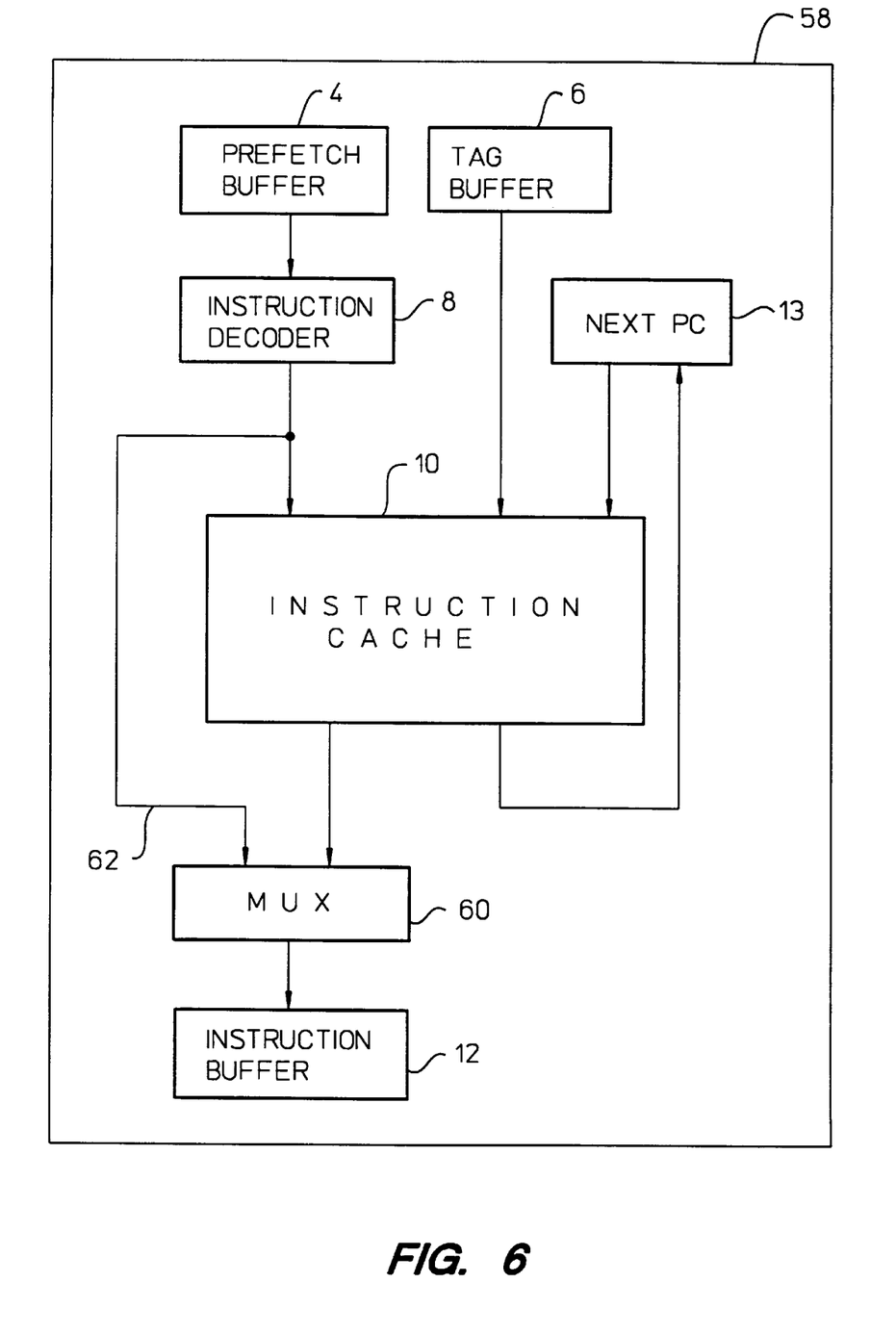
FIG. 6 is a block diagram of an alternative embodiment of an instruction unit according to the invention.

FIG. 6 is a block diagram of an alternative embodiment of an instruction unit according to the invention. An instruction unit 58 according to this embodiment is similar to the embodiment shown in FIG. 1. The differences are that in the embodiment in FIG. 6 the instruction unit 58 includes several enhancements. First, the instruction cache 10 includes an additional write port so that a decoded instruction and its tag address can be stored while the current instruction is being read from the instruction cache 10. Second, bypass circuitry is provided so that when a cache miss occurs (i.e., the instruction requested is not stored in the instruction cache) the current instruction can be output from the instruction unit 58 without having to be stored to and read from the instruction cache 10, thereby shortening the delay associated with a cache miss. The bypass circuitry in this embodiment includes a multiplexer 60 and a bypass bus 62.

Figure 7:
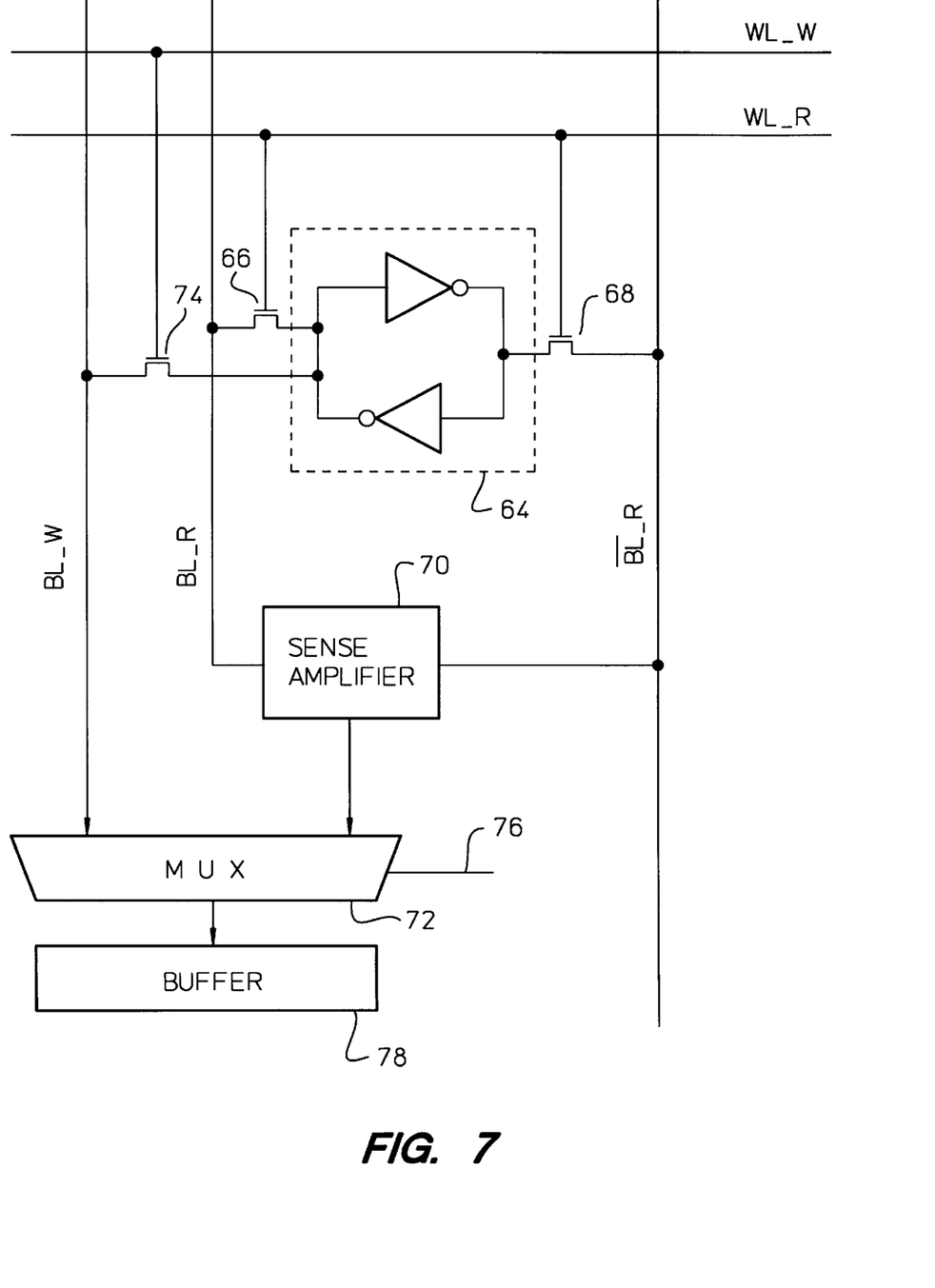
FIG. 7 is a block diagram of a preferred implementation of the bypass circuitry shown in FIG. 6.

FIG. 7 is a block diagram of a preferred implementation of the bypass circuitry. Although a single bit line is illustrated in FIG. 7, the approach is actually implemented with each of the bit lines of a cache memory. The approach shown in FIG. 7 is applicable regardless of what the cache memory is used for. For example, the cache memory may be an instruction cache or a data cache. In any case, a single memory cell 64 of a cache memory is shown in FIG. 7. The memory cell 64 is connected to read ports 66 and 68. When the read ports 66, 68 are activated by a read word line (WL_R), data held in the memory cell 64 is placed on a bit line (BL_R) and its complement is placed on a complement bit line (BL_R). The data on the bit lines are sensed by a differential sense amplifier 70 and output to a multiplexer 72. The data placed on a write bit line (BL_W) is stored in the memory cell 64 when a write port 74 is activated. The data placed on the write bit line (BL_W) is also supplied to the multiplexer 72. Based on a control signal 76, the multiplexer 72 selects one of its data inputs as the output data. Consequently, when data is to be read from the memory cell 64, the multiplexer 72 selects and outputs the data it receives from the sense amplifier 70. On the other hand, when carrying out the bypass operation following a cache miss, the multiplexer 72 selects and outputs the data it receives from the write bit line (BL_W). In either case, the data output by the multiplexer 72 is held in a buffer 78.

Accordingly, this implementation (FIG. 7) is advantageous because the bit lines of the cache are also used as the bypass bus. Hence, not only are wiring requirements for the bypass bus eliminated by using this implementation, but data access following a cache miss is also reduced by a cycle because the data needed can be stored to the memory cell 64 simultaneous with the output of the data from the cache memory via the bypass route.

Although the invention has been described with respect to computer systems which use variable-length instructions, the invention is equally applicable to the simplified case in which the instructions are of a fixed length so that the next sequential address is statically known or to the simplified case in which no decoding is necessary. In either case, the next PC determination unit 30 shown in FIG. 4 would contain only a single sequential address (instead of several sequential addresses) and the one or more size bits (Sz) would no longer be necessary.

It may also be preferable to provide two or more instruction caches such as described above. Performance would be improved because individually the caches are smaller and therefore faster. Further, in the case of two instruction caches, while issuing an instruction from one of the instruction caches, the other cache can be read ahead of time. Also, with two instruction caches and decoded instructions, for a given instruction-word some of the decoded instructions are stored to the first cache and the remaining decoded instructions are stored to the second cache. In the case where the two instructions caches store encoded instructions or fixed-length instructions, one cache could store even addresses and the other cache could store odd addresses.

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An instruction unit for a computer using pipeline processing to execute variable-length instructions, said instruction unit comprising:

an instruction cache having numerous entries, each entry having a first portion for storing an instruction, a second portion for storing an address tag corresponding to the instruction, and a third portion for storing sequence control information associated with the instruction, said sequence control information including instruction size information, said instruction cache being partitioned into a first memory array for storing said first portion, a contents addressable memory array for storing said second portion, and a second memory array for storing said third portion;

said first memory array being coupled to said contents addressable memory array by a first set of word lines and said third memory array being coupled to said contents addressable memory array by a second set of word lines, such that each entry in said contents addressable memory array is coupled to corresponding entries in said first and second memory arrays;

said first memory array and said second memory array located adjacent to said content addressable memory array and on opposite sides of said content addressable memory array, and a next-address determination circuit for determining an address for a next instruction based on the sequence control data corresponding to a current instruction; and each row in said first portion for storing an instruction having a substantially greater number of bits than each row in said third portion, whereby, during a fetch stage of the pipeline processing, when an address for a current instruction matches one of the address tags stored in an entry in said contents addressable portion said first and second matchlines corresponding to said entry in said second portion are activated causing the current instruction read from the first portion of said instruction cache while at the same time the sequence control information associated with the current instruction is read from the third portion of said cache and said next-address determination circuit determines the address for the next instruction.

2. An instruction unit as recited in claim 1, wherein the second portion drives a match line corresponding to an entry in which the stored address tag corresponding to the entry is equal to the address of the current instruction, and the match line drives both a first word line for the first portion and a second word line for the third portion.

3. An instruction unit as recited in claim 2, wherein the first portion includes memory cells which drive a first set of bit lines when the first word line is active, and the third portion includes memory cells which drive a second set of bit lines when the second word line is active.

4. An instruction unit as recited in claim 3, wherein the second set of bit lines stabilize before the first set of bit lines.

5. An instruction unit according to claim 1, wherein the first set of word lines and the second set of word lines have different load impedances, such that the first set of word lines have a greater latency than the second set of word lines.

6. An instruction unit for storing instructions received from an instruction stream for functional units of a computer, said instruction unit comprising:
 a prefetch buffer for temporarily storing an instruction received from the instruction stream;
 an instruction decoder for decoding the instruction stored in said prefetch buffer to produce at least one decoded instruction and related sequence control data;
 a tag buffer for temporarily storing an instruction address corresponding to the instruction;
 an instruction cache having numerous entries, each entry having
  a first portion for storing the decoded instruction,
  a second portion for storing an address tag and subsequently comparing the stored address tag with a current instruction address, and
  a third portion for storing the related sequence control data, including instruction size information; and
 a next address determination circuit for determininin a next instruction address based on sequence control data obtained from the third portion of the instruction cache;
 wherein
  the second portion of the instruction cache is operatively coupled to the first and third portions by a set of match lines, and
  the second portion drives for each entry in which a stored address tag is equal to a current instruction address, a match line to thereby cause the third portion to provide corresponding sequence control data to the next address determination circuit and the first portion to output the decoded instruction.

7. An instruction unit as recited in claim 6, wherein the third portion stores a relatively smaller number of bits in each entry compared to the number of bit stored in the first portion.

8. An instruction unit as recited in claim 6, wherein the first, second and third portions of said instruction cache are separate memory arrays.

9. An instruction unit as recited in claim 6, wherein the second portion drives a match line corresponding to an entry in which the stored address tag corresponding to the entry is equal to the current instruction address, and the match line drives both a first word line for the first portion and a second word line for the third portion.

10. An instruction unit as recited in claim 9, wherein the first portion includes memory cells which drive a first set of bit lines when the first word line is active, and the third portion includes memory cells which drive a second set of bit lines when the second word line is active.

11. An instruction unit as recited in claim 10, wherein the second set of bit lines stabilize before the first set of bit lines.

12. An instruction unit as recited in claim 6, wherein said next-instruction determination unit includes:
 selection means for selecting the next instruction address from a set of potential address, the potential addresses including at least a sequential address and a target address.

13. An instruction unit as recited in claim 12, wherein the second set of bit lines stabilize before the first set of bit lines.

14. An instruction unit as recited in claim 13, wherein in a given clock cycle for the computer, the second set of bit lines stabilize, are read, and the next instruction determined while at the same time the first set of bit lines stabilize and are read.

15. An instruction unit as recited in claim 6, wherein said instruction unit further comprises bypass means for bypassing said instruction cache on a cache miss.

16. An instruction unit for a computer system, comprising: an instruction cache, said instruction cache including at least
 a first memory array for storing instructions for the computer system,
 a content addressable memory array for storing an address for each of the stored instructions in said first memory array and located adjacent to said first memory array,
 a second memory array for storing sequence control data for each of the stored instructions in said first memory array, including instruction size information, said second memory array located adjacent to said content addressable memory array and opposite from said first memory array;
 comparing means for comparing an instruction address for the instruction to be read from said first memory array with the addresses stored in said content addressable memory array,
 a first set of bit lines coupled to storage cells within said first memory array,
 a second set of bit lines coupled to storage cells within said second memory array, said second set of bit lines stabilizing before the first set of bit lines,
 a first set of word lines coupled to the storage cells within said first memory array,
 a second set of word lines coupled to the storage cells within second memory array, and
 a plurality of match lines, each match line driving one of said word lines of said first and second set of word lines; and
 a next-instruction address determination circuit, operatively connected to said second set of bit lines, for determining a next instruction address,
 wherein when the instruction address for the instruction to be read from said first memory array is determined by said comparing means to be the same as one of the addresses stored in said content addressable memory array, then the word line corresponding this entry from each of said first and second set of word lines is activated via the corresponding match line, thereafter data corresponding to the instruction to be read is placed on said first set of bit lines and the associated sequence control data is placed on said second set of bit lines, and
 wherein said next-instruction address determination circuit determines the next instruction address based on the sequence control data obtained from the second set of bit lines.

17. An instruction unto as recited in claim 16, wherein the next instruction address determined by said next-instruction address determination circuit and the data corresponding to the instruction being read from said first memory array are simultaneously latched for the next cycle.

18. An instruction unit as recited in claim 16, wherein said next-instruction determination circuit comprises:
 selection means for selecting the next instruction address from a set of potential addresses, the set of potential addresses including at least a sequential address and a target address.

* * * * *